United States Patent [19]

Staron et al.

[11] Patent Number: 5,382,760
[45] Date of Patent: Jan. 17, 1995

[54] SEISMIC WELL SOURCE

[75] Inventors: Philippe Staron, Bardin; Jean Laurent, Morainvilliers, both of France

[73] Assignee: Institut Francais du Petrole, Rueil-Malmaison, France

[21] Appl. No.: 5,333

[22] Filed: Jan. 19, 1993

[30] Foreign Application Priority Data

Jan. 20, 1992 [FR] France ............... 92 00631

[51] Int. Cl.$^6$ .................. G01V 1/36; B21B 47/02
[52] U.S. Cl. .................... 181/121; 181/106; 175/1
[58] Field of Search ........... 181/106, 121, 102, 113; 175/1; 367/82, 25, 57; 381/190

[56] References Cited

U.S. PATENT DOCUMENTS

| | | | |
|---|---|---|---|
| 3,282,372 | 11/1966 | Brown et al. | 181/121 |
| 3,287,696 | 11/1966 | Cholet et al. | 181/121 |
| 3,866,709 | 2/1975 | Mifsud | 181/114 |
| 3,934,673 | 1/1976 | Silverman | 181/121 |
| 3,983,957 | 10/1976 | Silverman | 181/121 |
| 4,033,429 | 7/1977 | Farr | 181/106 |
| 4,040,003 | 8/1977 | Beynet et al. | 181/106 |
| 4,144,949 | 3/1979 | Silverman | 367/25 |
| 4,207,619 | 6/1980 | Klaveness | 367/57 |
| 4,252,209 | 2/1981 | Silverman | 181/196 |
| 4,388,981 | 6/1983 | Fair . | |
| 4,675,852 | 6/1987 | Russell et al. . | |
| 4,703,343 | 10/1987 | Paulsson | 181/106 |
| 4,805,725 | 2/1989 | Paulsson | 181/106 |
| 4,965,774 | 10/1990 | Ng et al. | 367/25 |
| 4,991,685 | 2/1991 | Airhart . | |
| 5,031,158 | 7/1991 | Chamuel . | |
| 5,063,542 | 11/1991 | Petermann et al. | 367/82 |

FOREIGN PATENT DOCUMENTS

| | | | |
|---|---|---|---|
| 752296 | 7/1956 | United Kingdom | 367/25 |
| 303422 | 7/1971 | U.S.S.R. | 181/102 |
| 716013 | 2/1980 | U.S.S.R. | 367/25 |
| 8705707 | 9/1987 | WIPO . | |

Primary Examiner—Nelson Moskowitz
Attorney, Agent, or Firm—Antonelli, Terry, Stout & Kraus

[57] ABSTRACT

The seismic source (5) according to the invention is associated with a drill string (1) linking a drill bit to a surface installation close to the bit. It comprises a closed chamber (6) fastened inside a drill cellar (4) of the drill string. The section thereof is smaller than the inner section of the drill string, so as to allow free circulation of the drilling fluid. A reactive mass (8) may move within this chamber (6) and along the axis of drill string (1). Hydraulic or electro-mechanical means allow a strong alternating force of controlled frequency and duration to be applied to this mass. The energy necessary to the operating thereof is taken from the fluid current. This source requires no substantial modification in the usual drilling equipments. Drilling a well and performing seismic measurings may be achieved at the same time by means of the source by arranging sensors at the surface and/or in one or several adjacent wells.

16 Claims, 2 Drawing Sheets

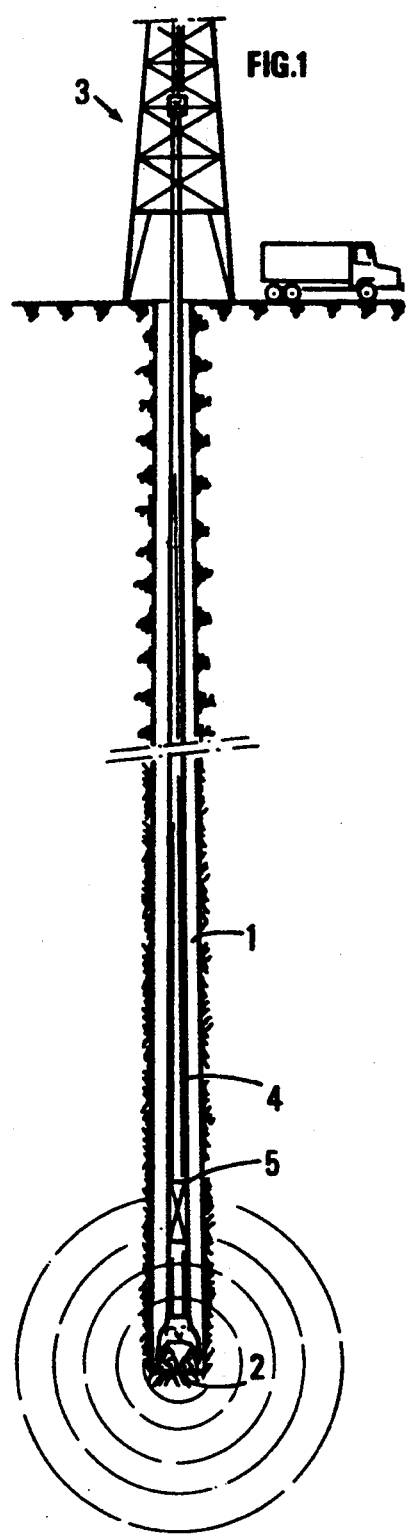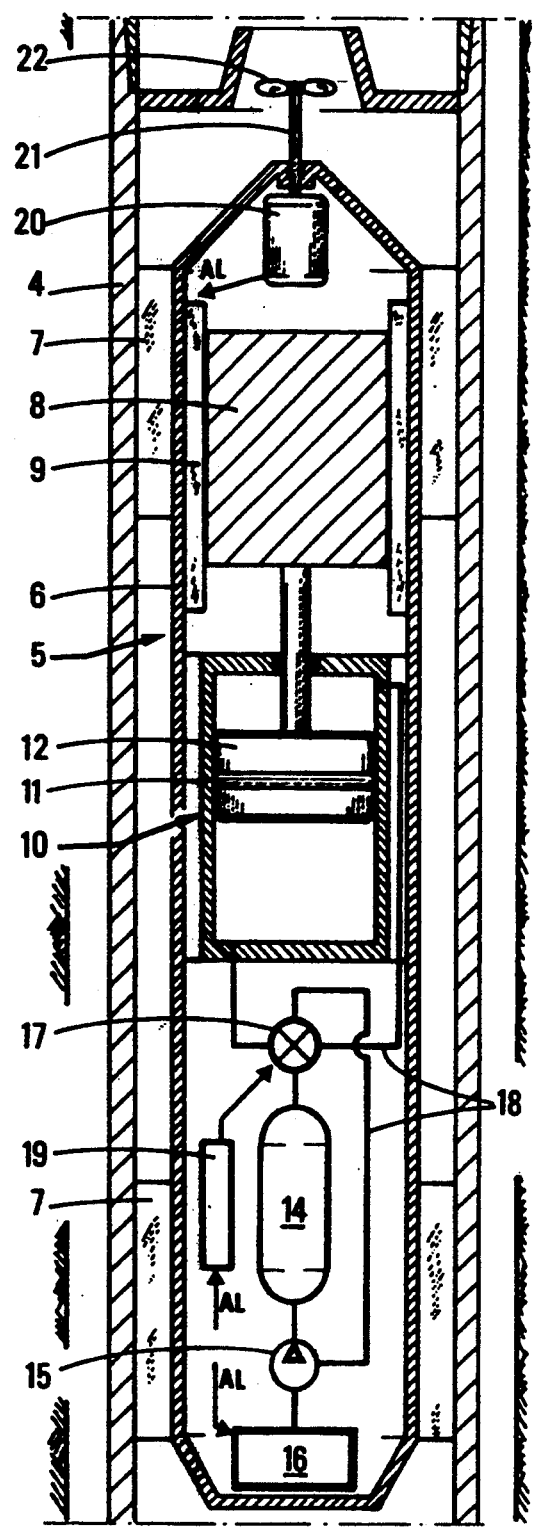

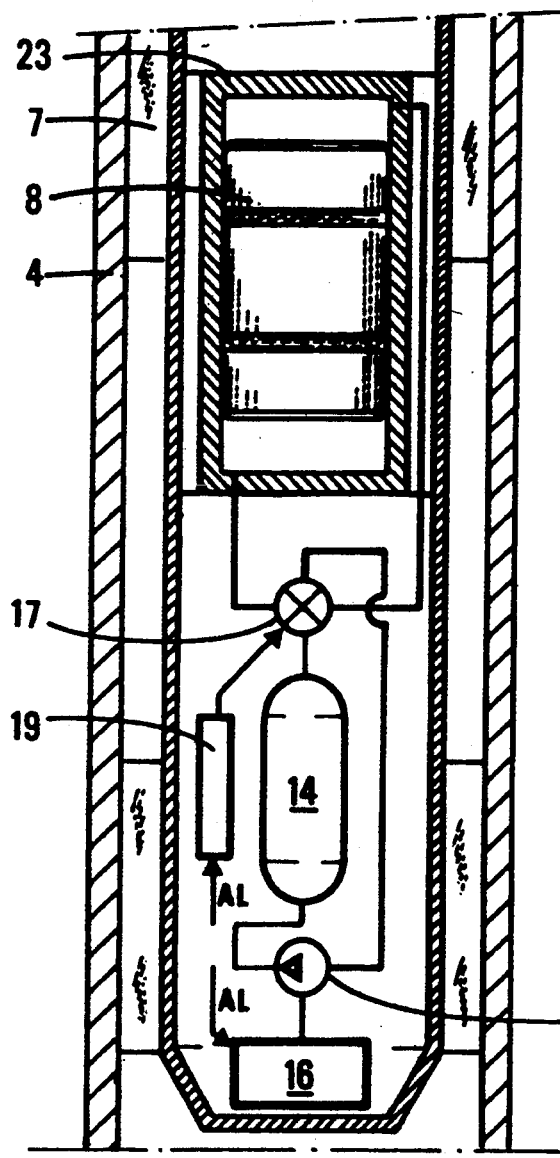
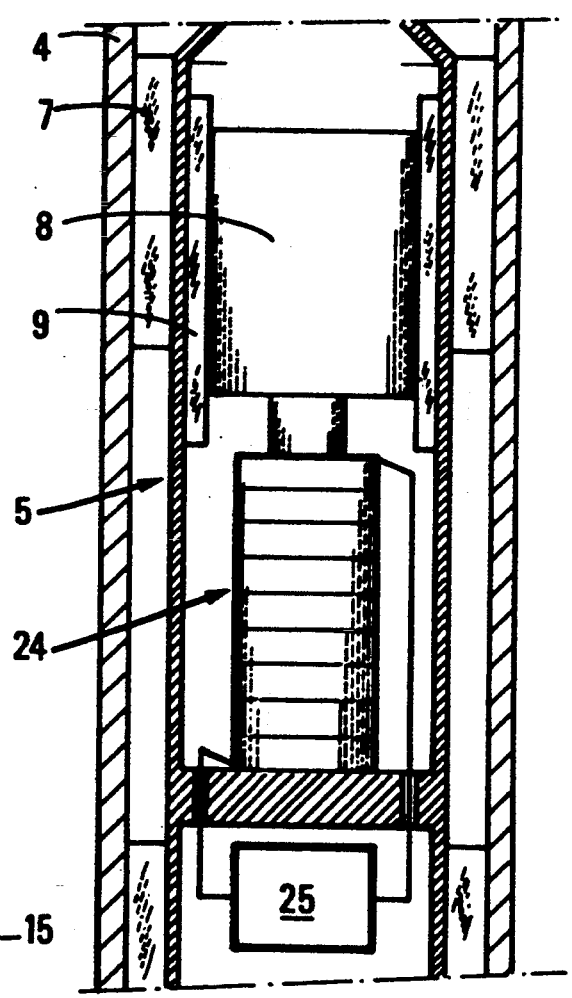

SEISMIC WELL SOURCE

FIELD OF THE INVENTION

This invention elates to a seismic well source which may be associated with a drill string. The source according to the invention is particularly adapted to communicate to a drill bit in a well periodic vibrations and to apply them to the surrounding formations.

BACKGROUND OF THE INVENTION

There are numerous methods for performing seismic prospecting in formations crossed by a well, including the emission of seismic pulse signals or of vibrational signals by a source lowered into the well, in order notably to avoid the disturbances transmitted by the weathering zone when the signals are emitted at the surface, the reception of the signals reflected by the subsoil discontinuities by means of a reception device located in the well, in another well or at the surface, and the recording thereof. Numerous processings are generally applied to the recordings so as to make them more readable to the interpreter.

Among the numerous emission devices for wells, some have been specially designed to work in relation or in combination with a drill bit. These operations, referred to as MWD operations, allow prospecting operations to De achieved without stopping the drilling of a well and therefore exploration costs to be decreased.

Emission devices are for example known with which the vibrations applied to formations are the "noises" generated by a drill bit operated at the end of a drillstem or drill string. The amplitude of these vibrations may vary to a large extent according to the hardness of the formations crossed by the bit. Conventional processing methods are generally very difficult to utilize with the recordings obtained with this type of emission because the characteristics of the source are not well-known. The signal is emitted permanently and no reference instant can be set. Moreover, the frequency spectrum emitted depends on the rotating speed of the bit and on the nature of the beds drilled. In order to know at any time the phase of the signals emitted, it is necessary to have a sensor located close to the drill bit and any transmission channel allowing a signal in phase with the signals emitted to be transmitted to a surface processing equipment. It may be, for example, the transmission of acoustic waves modulated according to the signals to be transmitted, along the fluid contained in the well, as described for example in U.S. Pat. No. 4,675,852, or possibly along the pipes of a drill string.

Among well sources, those which transmit, to the formations crossed, seismic impulses generated by shocks of the drill bit on the hole bottom may also be cited, these shocks being isolated or repeated with a determined period. To create these shocks, it is possible to use the surface operating device to exert a momentary traction on the drill string and to vary momentarily the force of gravity applied onto the bit. The shocks Of the drilling head on the hole bottom may also be generated by a percussion drill bit constituted by interposing, between the drilling head and the drill string, a telescopic hydraulic device which may be contracted through a momentary pressure on the string and which, while slackening with a given delay when this pressure is loosened, applies a shock onto the bit. It is also possible to bring about shocks on the drill bit by triggering off "water hammers" through a sudden interruption of the mud flow circulating within the drill string. The main drawback of devices of this type is that, as they are interposed between the drill bit and the drill string, they require modifications in the usual drilling equipment and they have to bear the total weight exerted on the bit, which may be a source of brittleness.

SUMMARY OF THE INVENTION

The seismic well source according to the invention makes it possible to communicate, to a drill bit linked to a surface installation through a drillstem or drill string, an alternating force of controlled frequency, and to communicate it to the formations at the bottom of a well, without requiring any substantial modification in the usual geometry of drilling equipments.

It comprises an elongate closed chamber having a section smaller than the inner section of the drillstem, in order to allow passage of drilling fluid, this chamber being fastened inside a pipe close to the drill bit, a reactive mass displaceable inside the chamber and along the direction of elongation thereof, and motor means arranged in said chamber for communicating to the reactive mass an alternating force of controlled amplitude and frequency.

According to one embodiment, the means for generating said force comprise, for example, at least one jack with a stationary body with respect to the chamber and a pipe which is fastened to the mass, as well as a hydraulic system communicating with the body of the jack so as to apply the alternating force onto the pipe thereof and onto the reactive mass.

According to another embodiment, the means for generating said force comprise a hollow body fastened inside the chamber, the reactive mass being adapted for sliding in a substantially tight way inside the body, and a hydraulic system communicating with the body on either side of the reactive mass, in order to apply thereto the required alternating force.

The hydraulic system comprises hydraulic circuits containing a fluid, a pump for carrying the fluid into the circuits at a determined pressure, motor means arranged in the chamber to drive the pump and delivery means to supply the fluid under pressure in order to apply the driving alternating force to the reactive mass.

According to another embodiment, electro-mechanical means are used to generate said force and linking means are used to transmit the vibrations generated by the electro-mechanical means to the reactive mass. These means may comprise, for example, piezoelectric elements piloted by an emission assembly or an electrodynamic vibrator.

According to an advantageous embodiment, the source according to the invention comprises means actuated by a fluid current circulating in the drillstem to produce energy for the running of the motor means, these means comprising for example an electric current generator or a hydraulic energy generator.

The source preferably comprises an electronic piloting assembly for controlling said motor means.

Communication means may be used between the chamber and a surface installation, such as elements providing connection through modulated pressure waves.

The source according to the invention is simply inserted inside a drill pipe and it does not interfere in the transmission of the weight applied onto the bit. It is contained in a closed chamber whose section is smaller than the inner section of the pipe to which it is fastened. It does practically not affect the drilling fluid current circulating inside the drill string and does therefore not modify the drilling parameters. It may work permanently, at determined intervals or on order, by communicating a strong force to the reactive mass inside, a force which is transmitted to the bit through the string. The source may also be totally autonomous and take (by means of a propeller generator for example) the energy necessary for working from the drilling fluid current. In the closed chamber, it is possible to arrange communication means allowing reception, from the surface installation, of orders of triggering and of control of the frequency of the shakings applied and, return, communication to the surface installation of the working control signals.

Absorption means are preferably interposed on the drill string so as to avoid transmission thereto of at least part of the energy created by the running of the source.

The invention also relates to a method for implementing the seismic source, comprising:
setting seismic sensors at the surface and/or in at least one well,
setting the source interposed on an element of the string close to the drill bit,
drilling a well by means of said drill bit, and
recording the modes received by the seismic sensors response to the shakings applied to the formations surrounding the well being drilled.

The method further comprises transmission of signals between the source and a surface installation, for example, to communicate to the latter a time reference relating to the working of the source.

BRIEF DESCRIPTION OF THE DRAWINGS

Other features and advantages of the source according to the invention will be clear from reading the description hereafter of embodiments given by way of non limitative examples, with reference to the accompanying drawings in which:

FIG. 1 diagrammatically shows a drill rig to which the seismic source according to the invention may be added, FIG. 2 diagrammatically shows a first embodiment of the source with a reactive mass and a jack, FIG. 3 shows a second embodiment of the source with a reactive mass sliding inside a closed body located in the chamber, and FIG. 4 shows another embodiment where the force applied the reactive mass is of piezoelectric origin.

DESCRIPTION OF THE PREFERRED EMBODIMENTS

The seismic source according to the invention may be associated (FIG. 1) with a string of tubular pipes (drill string) 1 connecting a drill bit 2 to a surface installation comprising a derrick 3. It is included for example (FIG. 2) inside a tubular drill collar 4 of the drill string close to the drill bit. The seismic source 5 is included in an elongate rigid chamber 6 which is fastened to the inner wall of pipe 4 through flanges 7. The outer section of chamber 6 is smaller than the inner section of pipe 4 and the flanges 7 are arranged to allow passage of the drilling fluid which is circulated from the surface towards the drill bit. A reactive mass 8, which may move parallel to the axis of the chamber and of the pipe between longitudinal guide rails 9, is arranged inside the closed chamber. This reactive mass 8 is integral with driving means capable of imparting thereto an alternating force of controlled amplitude and frequency. These means comprise, for example, a jack 10 provided with a cylindrical body 11 oriented along the axis of the chamber, a piston 12 sliding tightly into the body 11 and a pipe 13 making the piston integral with the reactive mass. A hydraulic system is for example used to apply the alternating force onto piston 12 and thus to reactive mass 8. This system comprises a hydraulic accumulator 14, a hydraulic pump 15 to supply fluid under pressure into accumulator 14, an electric motor 16 to drive the pump, a supply valve 17 and lines 18 allowing the fluid under pressure from accumulator 14 to be applied into the cylinder 11 alternately on one side or on the opposite side of piston 12 so as to generate a strong alternating force which is communicated to the reactive mass 8. An electronic assembly 19 is also arranged inside the chamber to pilot the delivery of fluid by valve 17 so that the frequency of the alternating force applied at any time to the mass is well-defined or that this frequency follows in time a well-defined variation law. An electric generator such as an alternator 20 is for example arranged in the chamber. Its axis 21 is oriented parallel to that of the drill pipe and it goes through the wall of the chamber. It is connected to a propeller 22 which is driven in rotation by the drilling fluid that is circulated inside towards the drill bit.

Absorption means (of the type known by specialists as shock absorber for example) are interposed on the drill string above the source to prevent transmission, to the string, of the seismic energy generated by the working of the source.

Communication between the source and the surface installation may be achieved with a well-known technique by means of modulated or coded acoustic waves which are propagated along the well in the drilling fluid. To that end, the electronic assembly 19 is connected to an assembly for the emission-redption of acoustic signals (not shown) comprising transductor means arranged outside the chamber.

However, the source may also work automatically either permanently, with an uninterrupted chain of emission sequences where the emitted frequency varies according to a predetermined variation law, or discontinuously, with successive emission periods where the emission frequency is fixed or variable, separated by time intervals during which the emission is interrupted.

The means for applying the force and the reactive mass are selected so as to develop and to transmit to the bit a force strong enough. An adequate selection makes it possible to obtain an alternating force that is properly proportionate to the weight of the drill string weighing on the drill bit, so as to consequently generate a strong alternating shake in the formations in contact with the bit. If the mass of the drill string is about $10^4$ kg, the hydraulic system is adapted to generate an alternating force of about $2.10^4$ Newton.

According to another embodiment (FIG. 3), the reactive mass 8 is adapted to slide tightly into a cylindrical cavity inside a hollow body 23 integral with chamber 6 and the hydraulic circuits connect the two opposite ends of the hollow body 23 on either side of the mass with supply valve 17.

According to another embodiment, the reactive mass (FIG. 4) is in contact with an array 24 of piezoelectric pellets piled and connected in series or in parallel, depending on the case, to the terminals of an appropriate electric generator 25. Transmission of the force may be achieved through direct mechanical coupling between the block and the reactive mass, or by way of hydraulic linking means comprising hydraulic circuits and a coupling jack (not shown).

According to another embodiment, the electric generator 20 may be replaced by a hydraulic generator directly driven by propeller 22 in order to charge accumulator 14 and to actuate the reactive mass.

Without departing from the scope of the invention, the hydraulic or piezoelectric motor means described above may be replaced by any other means for creating an alternating force.

With the seimic source described above, seismic exploration operations can be performed while drilling a well. An array of seismic sensors is arranged at the surface and/or in another well, and the waves which they receive in response to the shakings applied onto the formations surrounding the wellbore bottom through the source are recorded.

We claim:

1. A seismic well source for applying an alternating force of controlled frequency to a drill bit at an end of a tubular drill string connected to a surface installation, which comprises an elongate closed enclosure fastened inside a drill collar of the drill string and arranged close to the drill bit, said enclosure having a cross-section smaller than an inner cross-section of the drill string to allow circulation of drilling fluid around the enclosure to the drill bit, a reactive mass displaceable inside said enclosure and along the direction of elongation thereof, motor means arranged in said enclosure for applying to the reactive mass a reciprocating force of controlled amplitude and frequency, said enclosure being spaced from said drill collar and said motor means including an energy converter for conversion of energy received from flow of the drilling fluid flowing outside said enclosure to energy for application to said reactive mass and absorbing means interposed on said drill string above said enclosure for dampening vibrations transmitted along the drill string.

2. A seismic well source as claimed in claim 1, wherein said motor means comprises at least one jack with a body fixed with respect to said enclosure, a piston connected with said reactive mass, a hydraulic system including hydraulic circuits containing a fluid different from the drilling fluid, pump means for supplying the fluid into the circuits at a determined pressure, a motor arranged in the enclosure for driving the pump means and delivery means to supply the fluid under pressure to the jack and to apply said reciprocating force to the piston of said jack; said motor means also including a propeller driven in rotation by the drilling fluid flowing outside the enclosure and inside the drill collar for rotating the converter.

3. A seismic well source as claimed in claim 1, wherein said motor means comprises a fixed hollow body arranged inside said enclosure, said reactive mass arranged to tightly slide inside said hollow body, and a hydraulic system including hydraulic circuits containing a fluid, a pump means for supplying the fluid into the circuits at a determined pressure, a motor arranged in the enclosure for driving the pump means and delivery means to supply the fluid under pressure to the hollow body on either side of the reactive mass for applying thereto said reciprocating force; said motor means also including a propeller driven in rotation by the drilling fluid flowing outside the enclosure and inside the drill collar for rotating said converter.

4. A seismic well source as claimed in claim 1, comprising electro-mechanical means in said enclosure for generating said reciprocating force and linking means to transmit the force generated by the electro-mechanical means to said reactive mass; said motor means further including a propeller driven in rotation by the drilling fluid flowing outside the enclosure and inside the drill collar for rotating said converter and an electric generator for providing electrical energy to said electro-mechanical means.

5. A seismic well source as claimed in claim 4, wherein the electro-mechanical means comprise piezoelectric elements piloted by a emission assembly fed by said electric generator.

6. A seismic well source as claimed in claim 4, wherein the electro-mechanical means comprise an electro-dynamic vibrator operatively associated with an emitting means fed by said electric generator.

7. A seismic well source as claimed in claim 1, wherein the converter for conversion of energy comprises an electric generator.

8. A seismic well source as claimed in claim 1, wherein the converter for conversion of energy comprises a hydraulic energy generator.

9. A seismic well source as claimed in any one of claims 7 and 8, further comprising a propeller operated by drilling fluid circulating in the drill string, said propeller being connected to said generator.

10. A seismic well source as claimed in claim 1, comprising an electronic piloting assembly for controlling said motor means.

11. A seismic well source as claimed in claim 1, further comprising communication means between said enclosure and said surface installation.

12. A seismic well source as claimed in claim 11, wherein the communication means comprise elements providing connection through modulated pressure waves.

13. A method for operating a seismic well source for applying an alternating force of controlled frequency to a drill bit at an end of a tubular drill string in a first well and connected to a surface installation, which comprises positioning an absorbing means on the drill string for dampening vibrations transmitted along the drill string, positioning a seismic well source comprising an elongate closed enclosure within the drill string above the drill bit and below the absorbing means, said enclosure having a cross-section smaller than an inner cross-section of the drill string to allow circulation of drilling fluid around the enclosure to the drill bit, said enclosure being fastened inside a drill collar of the drill string close to the drill bit and provided therein with a reactive mass displaceable inside said enclosure along the direction of the elongation thereof and with motor means arranged in said enclosure, said motor means including a converter for conversion of energy received from the drilling fluid flowing outside of said enclosure to energy for means for applying to the reactive mass a reciprocating force of controlled amplitude and frequency, said method further comprising:

setting seismic sensors at the surface and/or in at least one second well adjacent to the first well;

drilling in said first well by means of said drill bit while actuating said seismic well source; and recording waves received by the seismic sensors in response to vibrations applied to formations surrounding the first well by said seismic well source during said drilling.

14. A method as claimed in claim 13, further comprising effecting transmission of control signals between the seismic well source and a surface installation to control actuation of said source.

15. A seismic well source as claimed in claim 1, wherein movement of said reactive mass due to application of said reciprocating force effects application of the alternating force of controlled frequency to said drill string whereby vibrations are communicated to surrounding formations.

16. A method as claimed in claim 13, wherein said reactive mass is moved by application of the reciprocating force of controlled amplitude and frequency whereby an alternating force of controlled frequency is applied to the drill string and vibrations are applied to said formations surrounding the first well.

* * * * *